US005978001A

United States Patent [19]

Furlani et al.

[11] Patent Number: 5,978,001

[45] Date of Patent: Nov. 2, 1999

[54] MAGNETIC BRUSH DEVELOPMENT ROLLER

[75] Inventors: Edward P. Furlani, Lancaster; Thomas M. Stephany, Churchville; William Mey, Rochester, all of N.Y.

[73] Assignee: Eastman Kodak Company, Rochester, N.Y.

[21] Appl. No.: 08/868,099

[22] Filed: Jun. 3, 1997

[51] Int. Cl.[6] .............................. G11B 9/00; B41J 2/385; G01D 15/06

[52] U.S. Cl. .......................................... 346/74.5; 347/169

[58] Field of Search .................................... 347/169, 140, 347/151, 153; 346/74.5; 399/277, 282, 229

[56] References Cited

U.S. PATENT DOCUMENTS 3,914,771 10/1975 Lunde et al. .

*Primary Examiner*—John Barlow
*Assistant Examiner*—Raquel Yvette Gordon
*Attorney, Agent, or Firm*—Thomas H. Close

[57] ABSTRACT

A magnetic brush development roller assembly for an electrographic printer includes a cylindrical multipole magnet mounted for rotation about a cylindrical axis; and a conductive non-magnetic stationary shell surrounding the multipole magnet. The shell defines an axial slot for receiving an imaging head, and has a region of reduced conductance extending substantially around the circumference of the shell, whereby eddy currents generated by rotation of the magnet within the shell and hence resistive heating and drag on the magnet are reduced.

7 Claims, 6 Drawing Sheets

MAGNETIC BRUSH DEVELOPMENT ROLLER

CROSS-REFERENCE TO RELATED APPLICATIONS

The present application is related to U.S. application Ser. No. 08/767,356, filed Dec. 18, 1996, now U.S. Pat. No. 5,682,586, issued Oct. 28, 1997 by Thomas M. Stephany et al., and entitled, "Improved Magnetic Brush Development Roller for an Electrographic Printer".

FIELD OF THE INVENTION

The invention relates generally to the fields of electrography and in particular to magnetic brushes employed to transport magnetic developer in electrographic apparatus.

BACKGROUND OF THE INVENTION

U.S. Pat. No. 3,914,771 issued on Oct. 21, 1975, to Lunde et al, shows an electrographic printer which selectively transfers toner particles directly onto a receiver. It incorporates a magnetic brush assembly 10, which is shown in FIG. 1. This Prior Art brush assembly includes an imaging head 12 that is located within a slot on the exterior surface of the shell 14, and is substantially flush with the surface of the shell. It also includes a rotatable multi-pole magnet 16, mounted within the shell 14. FIG. 2. shows a second arrangement wherein the imaging head 12 is mounted directly upon the shell 14. The first arrangement is preferred since it eliminates the need for a ramp 19 to deliver toner particles to the imaging head 12, and provides a channel for electrical connections to the head. This slotted method of assembly, while easing the complexity of attaching the imaging head 12 to the shell 14, also creates a problem in manufacturing when the shell is conductive. The act of machining the slot 18, shown in FIG. 3, requires that the outside diameter of the shell 14 be increased by at least the thickness of imaging head 12 to maintain the structural integrity of the shell. The increased thickness of the metal, however, decreases the electromechanical efficiency of the magnetic brush 10. The rotation of the multi-pole magnet 16, within shell 14 by drive motor 20, generates eddy currents within the shell 14.

In applications using dual-component developers the shell of the magnetic brush must be conductive in order to minimize tribo-electrical charging of the developer during image development and also allow for the application of a bias voltage for adjusting image and background densities to acceptable values. In conventional electrophotography the magnetic brush's shell has nothing mounted on its surface and therefore can be made as thin as possible consistent with the requirement of a constant gap between the cylindrical permanent magnet core and the outer surface of the shell. However, if the shell is made thick enough to accommodate a printhead as shown in FIG. 4, when the core magnet is rotated to transport the developer, eddy currents 17 are generated along the length of the shell 14. The eddy currents dissipate power by resistive heating of the shell and react with the field of magnet 16 to generate a drag torque which acts in opposition to the drive torque thereby requiring significant additional power applied to the motor to rotate the core permanent magnet. The eddy currents 17 form closed loops that circulate along the length of the shell 14. This additional power not only degrades the motor performance but results in additional heat which can damage the motor as well as effect the physical and electrical properties of the developer.

SUMMARY OF THE INVENTION

The present invention is directed to overcoming one or more of the problems set forth above. Briefly summarized, according to one aspect of the present invention, a magnetic brush development roller assembly for an electrographic printer includes a cylindrical multipole magnet mounted for rotation about a cylindrical axis; and a conductive non-magnetic stationary shell surrounding the multipole magnet. The shell defines an axial slot for receiving an imaging head, and has a region of reduced conductance extending substantially around the circumference of the shell, whereby eddy currents generated by rotation of the magnet within the shell and hence resistive heating and drag on the magnet are reduced.

In one embodiment of the invention, the region of reduced conductance is provided by thinning the shell in a circumferential patter, either by a spiral or plurality of circular patterns. In another embodiment of the invention, the regions of reduced conductance are provided by regions of non conductive materials in the shell.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantages of requiring less power to drive and reducing undesired eddy current heating.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
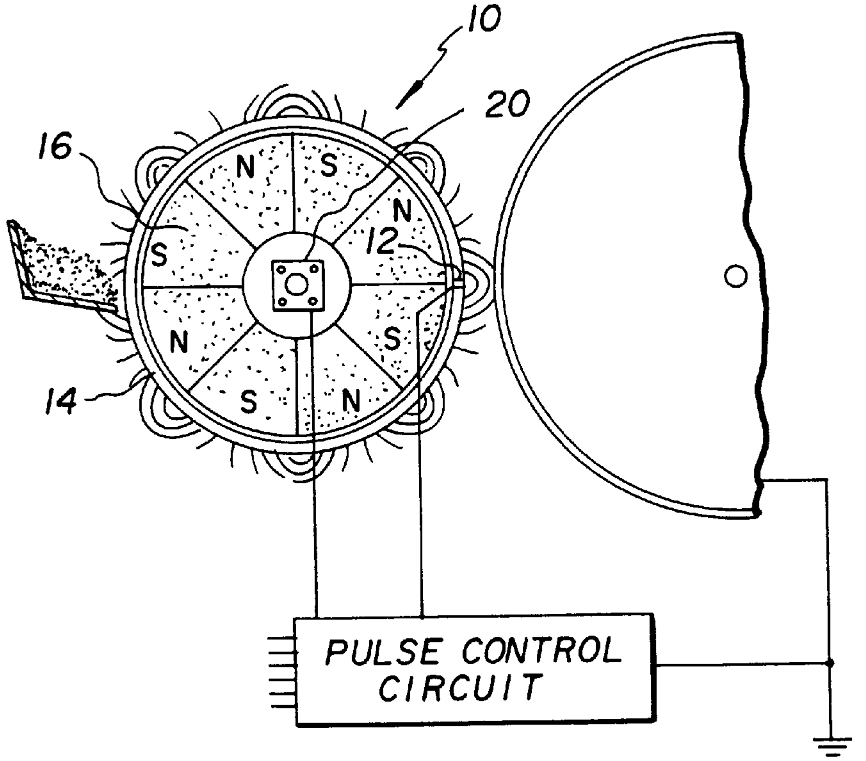
FIG. 1 (PRIOR ART)
FIG. 1 is a schematic diagram showing a prior art magnetic brush for use in an electrographic printer.
Figure 2:
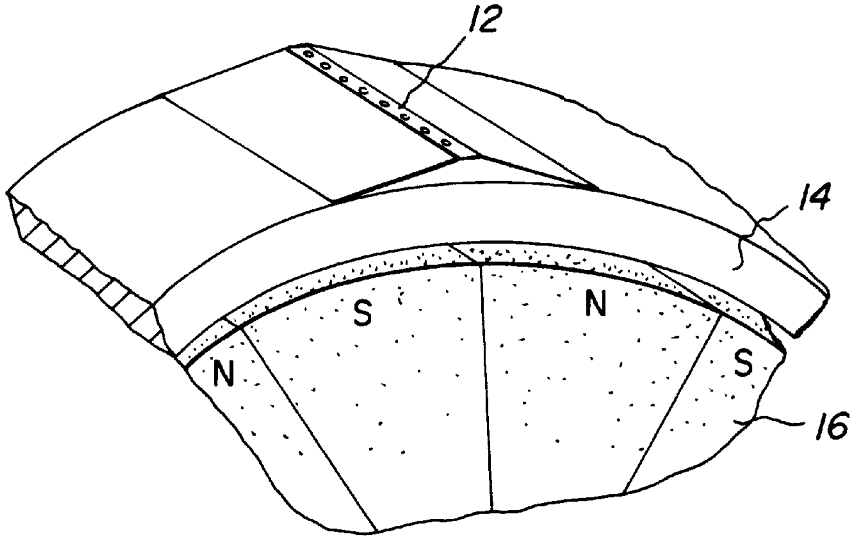
FIG. 2 (PRIOR ART)
FIG. 2 is a partial perspective view of an alternative prior art arrangement of a magnetic brush assembly.
Figure 3:
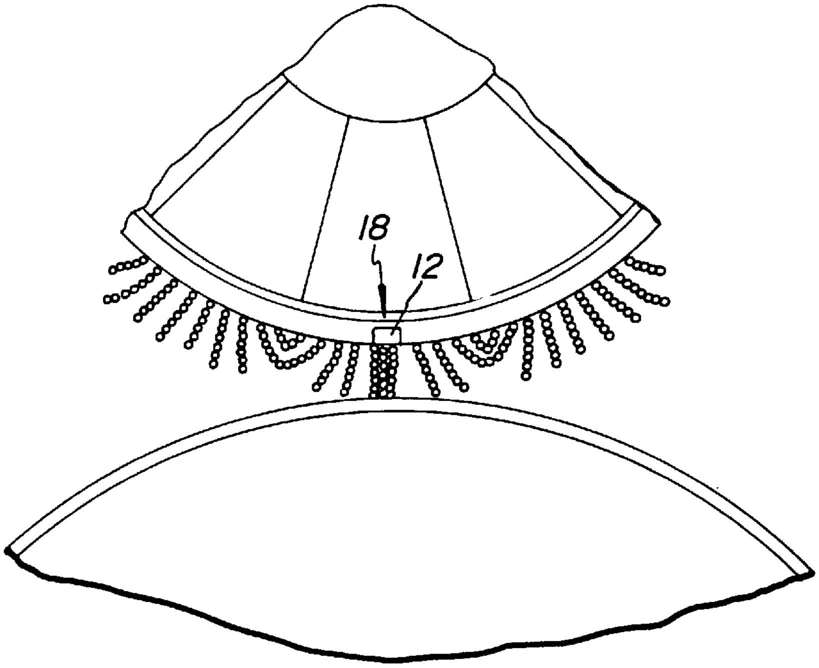
FIG. 3 ( PRIOR ART )
FIG. 3 is a partial side view of the prior art magnetic brush shown in FIG. 1.
Figure 4:
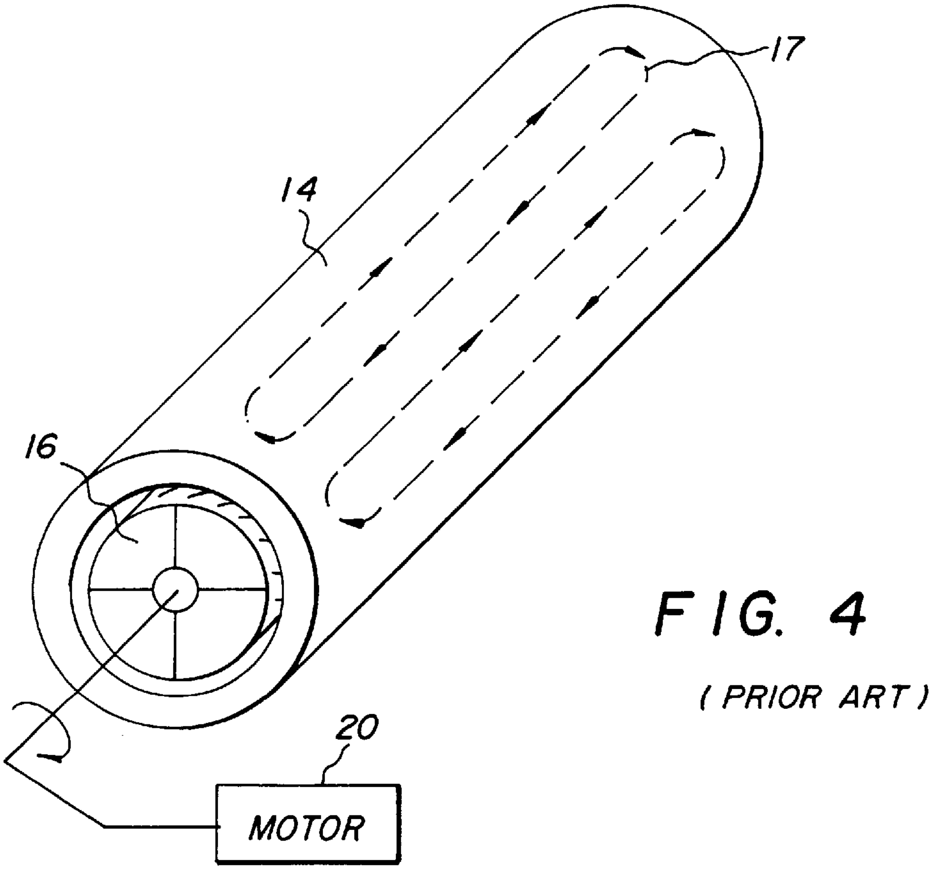
FIG. 4 ( PRIOR ART )
FIG. 4 is a perspective view showing the pattern of eddy currents in the shell of the prior art magnetic brush system.
Figure 5:
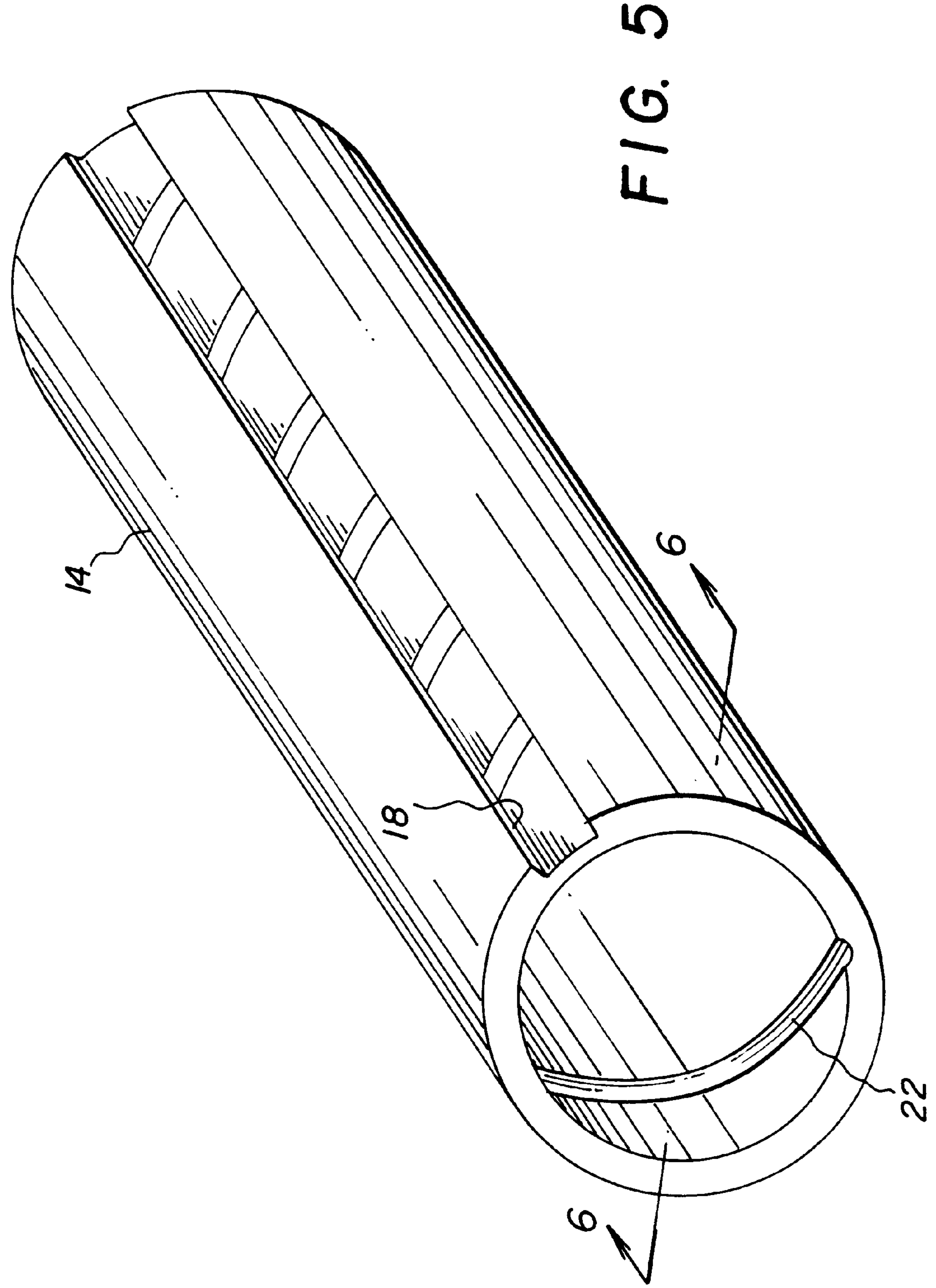
FIG. 5 is a perspective view of the shell of a magnetic brush according to the present invention wherein the regions of reduced conductivity are provided by helical thinned regions in the shell.
Figure 6:
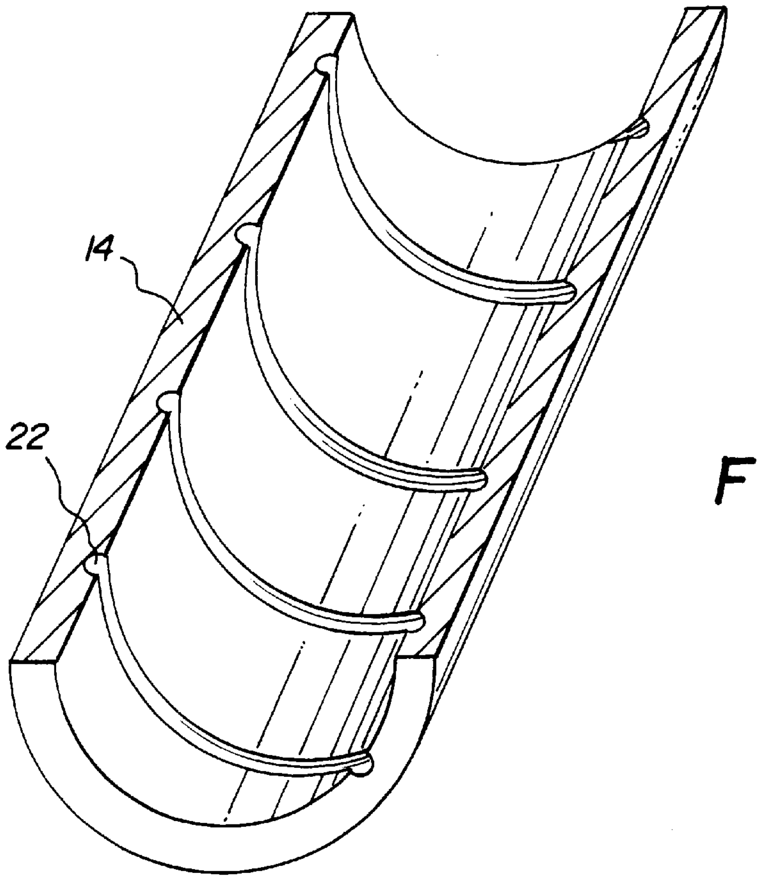
FIG. 6 is a perspective cross sectional view of the shell shown in FIG. 5 taken along lines 6—6.

Referring now to FIG. 5 and 6, the present invention is directed to an improved shell 14 for a magnetic brush. The shell 14 is a conductive, non magnetic material, preferably non magnetic stainless steel or aluminum. The shell is thinned on the inside in a helical fashion along its length to provide the region of lower conductivity. The thinning of the conductive shell 14 entails the removal of conductive material on the inner surface of the shell to form a groove 22 along a helical path that extends the length of the shell. The depth of the groove is such that the distance t from the bottom of the groove to the surface of the shell is less than the skin depth of material from which the shell is made. The skin depth $D_S$ is computed as shown in equation 1.

$$D_s = \frac{1}{\sqrt{\sigma\mu\pi f}}, \tag{1}$$

where σ and μ are the conductivity and permeability of the shell respectively, and f is the frequency of the field reversal in the shell which is computed by taking the number of poles of the magnet divided by two, times the RPM of the magnet divided by 60.

It is instructive to note that the outside surface of the shell 14 remains smooth and uniformly conductive and will function the same as the prior art shell relative to the printing process. However, the improved shell of the present invention exhibits greatly reduced eddy currents relative to the prior art shell because the groove 22 provides high resistance to current flow along the length of the shell. Thus the improved shell 14 will eliminate undesired heating, reduce the power requirements on the motor employed to drive the magnet in the shell, and generally improve system performance.

Figure 7:
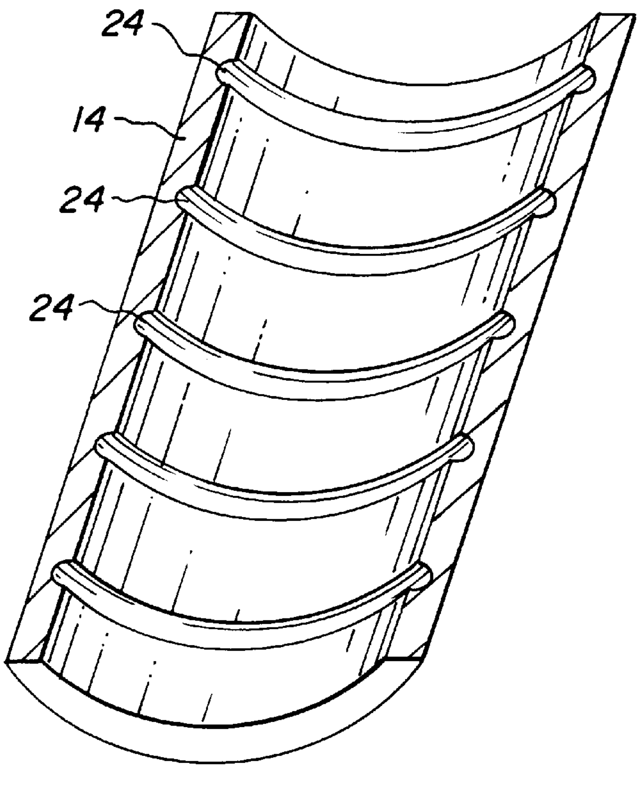
FIG. 7 is a perspective cross sectional view of the shell of a magnetic brush according to the present invention wherein the regions of reduced conductivity are provided by circumferential thinned regions in the shell.

Referring to FIG. 7, an alternative configuration of a shell according to the present invention employs a plurality of circumferential grooves 24 on the inside of the shell 14 to provide the circumferential regions of reduced conductivity.

Figure 8:
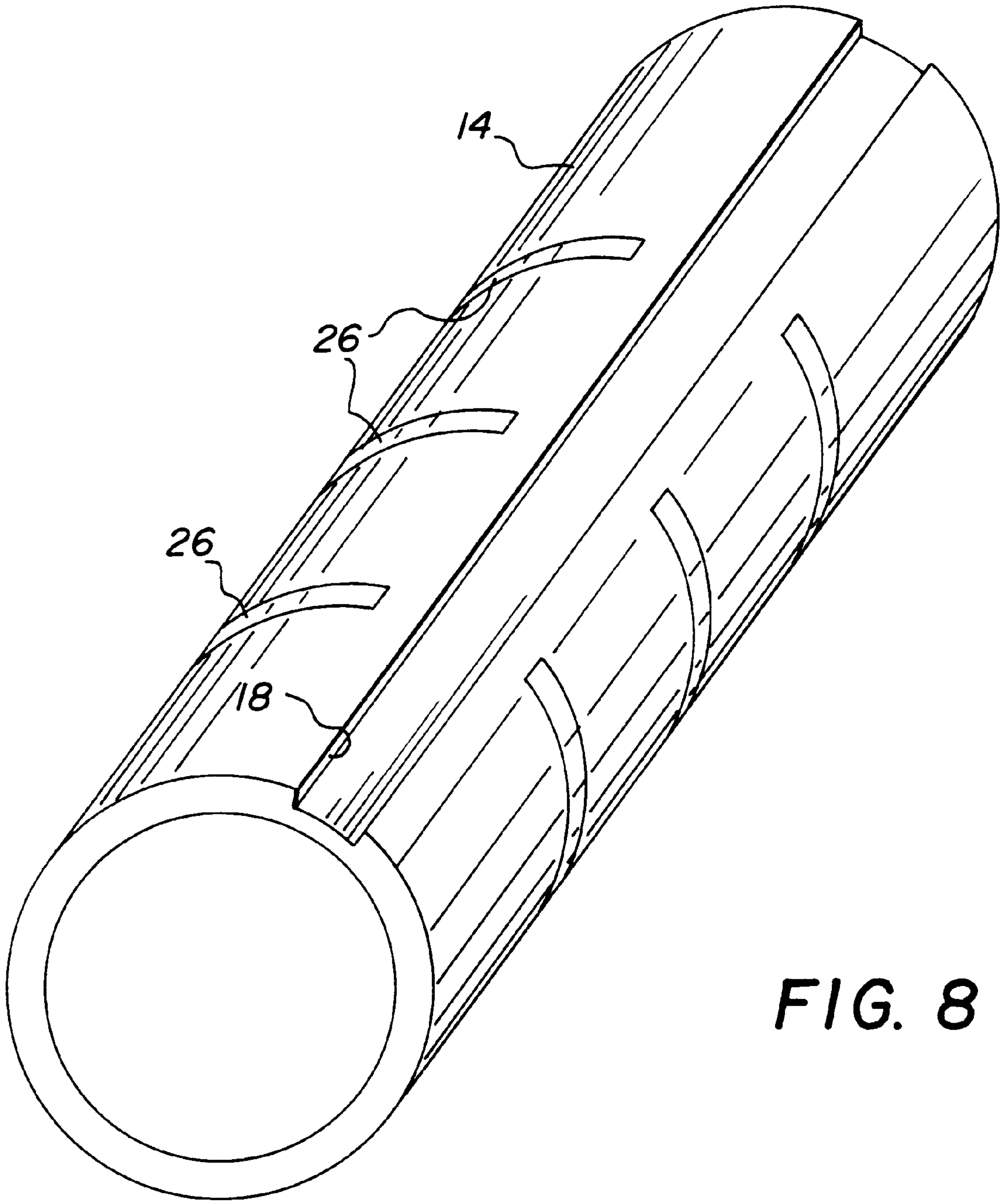
FIG. 8 is a perspective view of the shell of a magnetic brush according to the present invention wherein the regions of reduced conductivity are provided by rings of non conductive material.
Figure 9:
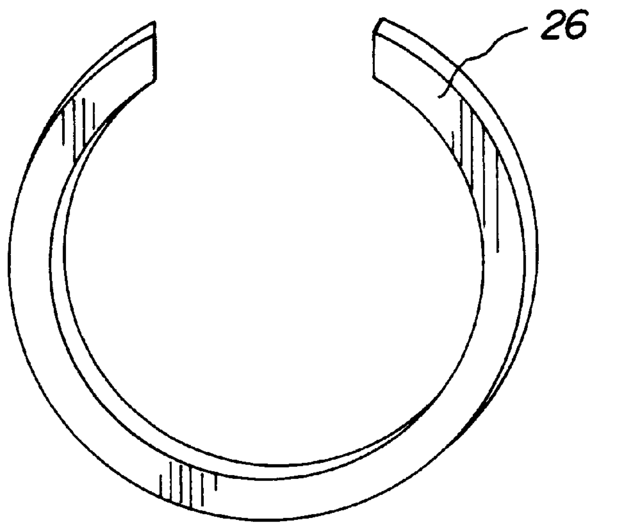
FIG. 9 is a perspective view of a ring of non-conductive material used in the shell of FIG. 8.

Referring to FIGS. 8 and 9, a further alternative configuration of a shell according to the present invention employs C-shaped rings 26 of non conductive material inset into circumferential slots in the outside surface of shell 14. The rings, for example, may be made of plastic while the shell is made of stainless steel or aluminum. The rings may be expanded and snapped into the grooves formed in the shell. Alternatively, the rings may be molded into the grooves using standard plastic forming processes.

Figure 10:
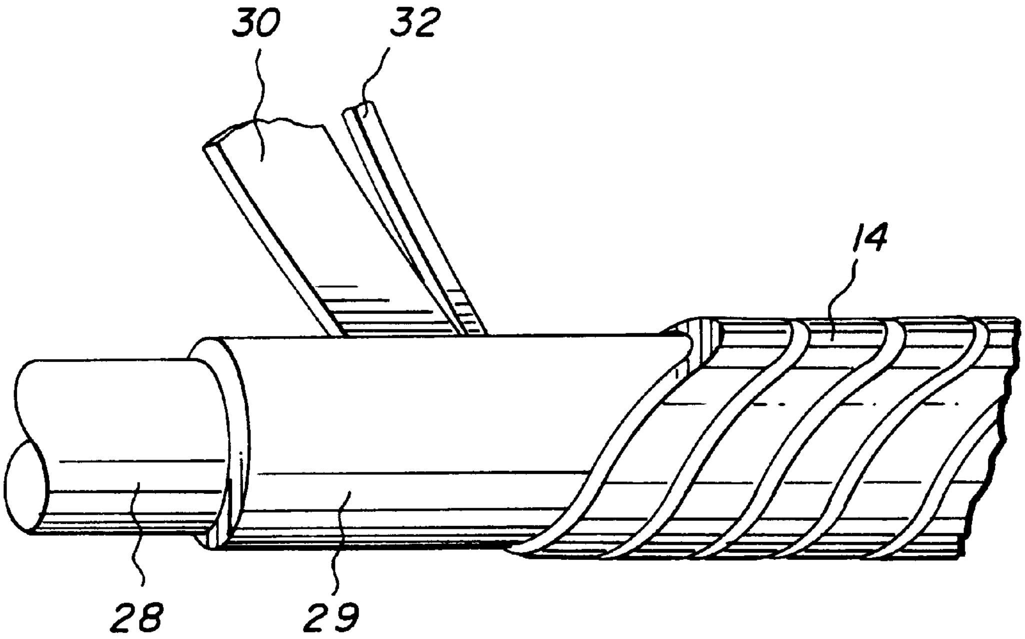
FIG. 10 is a perspective view of a shell of a magnetic brush according to the present invention that is fabricated by wrapping ribbons of conductive and non conductive material around a mandrel.

According to a still further embodiment of the present invention shown in FIG. 10, the shell 14 is fabricated from two strips of material that are wound around a mandrel 28 to form the shell. The mandrel 28 may be encased in a thin plastic shell 29 that is left inside the shell 14. A first strip 30, is composed of an electrically conductive material such as stainless steel or aluminum and a second strip 32 composed, for example, of plastic. The materials are bonded, for example, by epoxy to form the shell 14. The resulting magnetic material forms a spiral of non magnetic material along the length of the shell. A groove (not shown) is machined in the surface of the shell 14 for receiving the print head. Alternatively, alternating rings of conductive and non conductive material, e.g. aluminum and plastic may be placed on the mandrel 28 and bonded together using epoxy.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | brush assembly |
| 12 | imaging head |
| 14 | shell |
| 16 | magnet |
| 17 | eddy currents |
| 18 | slot |
| 20 | drive motor |
| 22 | helical groove |
| 24 | circumferential grooves |
| 26 | C-shaped rings |
| 28 | mandrel |
| 29 | plastic shell |
| 30 | conductive strip |
| 32 | non-conductive strip |

We claim:

1. A magnetic brush development roller assembly for an electrographic printer, comprising:

a) a cylindrical multipole magnet mounted for rotation about a cylindrical axis; and b) a cylindrical conductive non-magnetic stationary shell surrounding the multipole magnet, and having a circumference, an axis, a length and a first section and a second section of conductance, and exhibiting eddy currents resulting in resistive heating and drag on the magnet when the magnet is rotated in the shell, the shell defining an axial slot for receiving an imaging head, and the second section of the shell has reduced conductance as compared to the first section, wherein the second region extends substantially around the circumference of the shell, whereby eddy currents generated by rotation of the magnet within the shell and hence resistive heating and drag on the magnet are reduced.

2. The magnetic brush claimed in claim 1, wherein the regions of reduced conductance comprise thinned second section of the shell.

3. The magnetic brush claimed in claim 2, wherein the thinned section defines a spiral pattern concentric with the axis of and extending along the length of the shell.

4. The magnetic brush claimed in claim 2, wherein the thinned section defines a plurality of spaced apart rings around the circumference of the shell.

5. The magnetic brush claimed in claim 1, wherein the second section of reduced conductance comprise material of reduced conductance.

6. The magnetic brush claimed in claim 5, wherein the material of reduced conductance forms rings around the shell.

7. The magnetic brush claimed in claim 5, wherein the material of reduced conductance forms a spiral around the shell.

* * * * *